United States Patent
Reid

(10) Patent No.: US 9,676,064 B2
(45) Date of Patent: Jun. 13, 2017

(54) CONTROLLABLY-FORMED BRAZING STRUCTURES AND RELATED COMPOSITIONS AND METHODS

(71) Applicant: Aarne H Reid, Jupiter, FL (US)

(72) Inventor: Aarne H Reid, Jupiter, FL (US)

( * ) Notice: Subject to any disclaimer, the term of this patent is extended or adjusted under 35 U.S.C. 154(b) by 0 days.

(21) Appl. No.: 14/520,586

(22) Filed: Oct. 22, 2014

(65) Prior Publication Data

US 2015/0110548 A1 Apr. 23, 2015

Related U.S. Application Data

(60) Provisional application No. 61/894,709, filed on Oct. 23, 2013.

(51) Int. Cl.
| | |
|---|---|
| *B23K 35/02* | (2006.01) |
| *B23K 35/36* | (2006.01) |
| *B23K 35/362* | (2006.01) |
| *B23K 1/00* | (2006.01) |
| *B23K 1/20* | (2006.01) |
| *B23K 35/28* | (2006.01) |
| *B23K 35/30* | (2006.01) |

(52) U.S. Cl.
CPC .......... *B23K 35/025* (2013.01); *B23K 1/0008* (2013.01); *B23K 1/203* (2013.01); *B23K 35/0222* (2013.01); *B23K 35/0244* (2013.01); *B23K 35/282* (2013.01); *B23K 35/286* (2013.01); *B23K 35/302* (2013.01); *B23K 35/3006* (2013.01); *B23K 35/3013* (2013.01); *B23K 35/3033* (2013.01); *B23K 35/362* (2013.01); *B23K 35/3613* (2013.01); *Y10T 403/479* (2015.01)

(58) Field of Classification Search
CPC B23K 35/025; B23K 35/3613; B23K 1/0008; B23K 1/0012; B23K 35/362
USPC .......................................................... 148/24
See application file for complete search history.

(56) References Cited

U.S. PATENT DOCUMENTS

| | | | | |
|---|---|---|---|---|
| 3,510,323 | A * | 5/1970 | Bosso | B01D 39/2093 252/62 |
| 7,374,063 | B2 | 5/2008 | Reid | |
| 7,681,299 | B2 | 3/2010 | Reid | |
| 2009/0068070 | A1 * | 3/2009 | Hashimoto | B01J 19/249 422/129 |
| 2014/0008417 | A1 * | 1/2014 | Visser | B23K 35/0222 228/56.3 |

* cited by examiner

*Primary Examiner* — Weiping Zhu
(74) *Attorney, Agent, or Firm* — Baker & Hostetler LLP

(57) ABSTRACT

The present disclosure provides compositions and methods for forming three-dimensional structures atop substrates. These structures may be formed and processed so as to braze together two substrates. The structures may be controllably formed in three dimensions so as to accommodate virtually any substrate geometry or configuration. The structures may also be disposed so as to maintain spacing between two surfaces.

16 Claims, 2 Drawing Sheets

US 9,676,064 B2

CONTROLLABLY-FORMED BRAZING STRUCTURES AND RELATED COMPOSITIONS AND METHODS

CROSS-REFERENCE TO RELATED APPLICATION

This application claims the benefit of and priority to U.S. Patent Application Ser. No. 61/894,709, "Controllably-Formed Brazing Structures And Related Compositions And Methods" (filed Oct. 23, 2013), the entirety of which application is incorporated herein by reference for any and all purposes.

TECHNICAL FIELD

The present disclosure relates to the fields of powder deposition, powder curing, and brazing.

BACKGROUND

Existing techniques for applying powdered materials to substrates (e.g., traditional powder coating) are limited in their application and capabilities. Accordingly, there is a need in the art for improved processes; processes capable of depositing materials so as to form a user-definable three-dimensional structure would be particularly valuable.

SUMMARY

Powder coating and laser deposition technology techniques relate to application of powder materials to deposit coatings on parts. Powder coating allows a user to use mixtures of powdered polymer materials by (1) applying (e.g., via spraying) the powder onto a metallic substrate; and (2) performing a separate, post-cure processing of the binder material.

In one aspect, the disclosed technology provides material application processes in which mixture constituents may include an metallic material (suitably a material that may be used in brazing) and a polymer binder that are applied and sintered onto a substrate (e.g., metal, glass, plastic) in a controlled manner. The disclosed process also allows for depositions at user-determined thickness and user-determined shapes.

In another aspect, the present disclosure provides methods in which a user may apply to a substrate a composition that includes a binder and an aerogel and then—in some embodiments—simultaneously cure the composition. The resultant structure may act to span (or even maintain) a gap between first and second surfaces or even first and second substrates. This may maintain a spacing between those surfaces. In some embodiments, the structure may support one or more surfaces so as to maintain the spacing between that surface and another surface.

Without being bound to any particular theory, the composition may be applied and processed such that the binder (e.g., polymer particles) acts to maintain aerogel material (e.g., in particulate form) in position so as to form a structure that spans a gap between two substrates. The gap (which may also be referred to as a spacing in some instances) may define a distance in the range of from about 50 nm to about 1 cm, or from about 500 nm to 0.5 cm, or from about 1000 nm to about 0.1 cm, or from about 10,000 nm to about 100,000 nm. Particularly suitable gap distances are, e.g., from about 0.001 microns to about 50 microns, to about 100 microns, to about 500 microns, or even to about 1,000 or 10,000 microns.

After the formation of this structure, further processing may be performed so as to braze the two substrates together by brazing a material (e.g., metallic particulates) disposed at a suitable location under suitable processing conditions. It is not a requirement that binder-aerogel structure be formed between two substrates, as the structure may be formed on a single substrate to a user's desired dimensions. In some embodiments, the binder-aerogel structure is formed so as to maintain a spacing between two (or more) surfaces. The structure may physically support a surface.

The technology disclosed herein addresses the gap between traditional powder coating processes and laser deposition technology (LDT). LDT has been primarily devoted to high power laser applications that essentially welds new metal and/or ceramic materials onto metal substrates as an additive manufacturing process. By using a comparatively low power laser to sinter a binder material only and suspending a metallic powder in the matrix for brazing applications, the user can control and in some cases reduce the amount of brazing material used. This is a consideration for some users, as brazing material (e.g., gold) can be expensive.

A user can also control the dimensions of the deposition directly from computer-assisted design ("CAD") information. As one non-limiting example, CAD information may be used to modulate the activity of a sprayer, printer head, or other deposition device. A structure may be deposited in a single pass of a deposition device, but may also be deposited in a step-wise or layer-wise fashion. Solidification of the structure may also be performed in a single step but may also be performed in a step-wise or layer-wise fashion.

Without being bound to any particular theory, use of an aerogel allows for controllably—and precisely—spacing surfaces of brazed parts so as to reduce or even avoid thermal shorts between surfaces. As shown in FIG. 2, the disclosed technology also allows for bending parts while also maintaining spacing between the surfaces of the parts. As shown in exemplary FIG. 2, after brazing, aerogel exists as an extremely low thermally conductive remnant powder between the surfaces. Without being bound to any particular theory, combination of organic substances in a powder mixture form for this purpose and using a heat treatment or deposition (e.g., LDT) method is a significant advance over the existing art.

BRIEF DESCRIPTION OF THE DRAWINGS

The summary, as well as the following detailed description, is further understood when read in conjunction with the appended drawings. For the purpose of illustrating the invention, there are shown in the drawings exemplary embodiments of the invention; however, the disclosure is not limited to the specific methods, compositions, and devices disclosed. In addition, the drawings are not necessarily drawn to scale. In the drawings.

DETAILED DESCRIPTION OF ILLUSTRATIVE EMBODIMENTS

Figure 1:
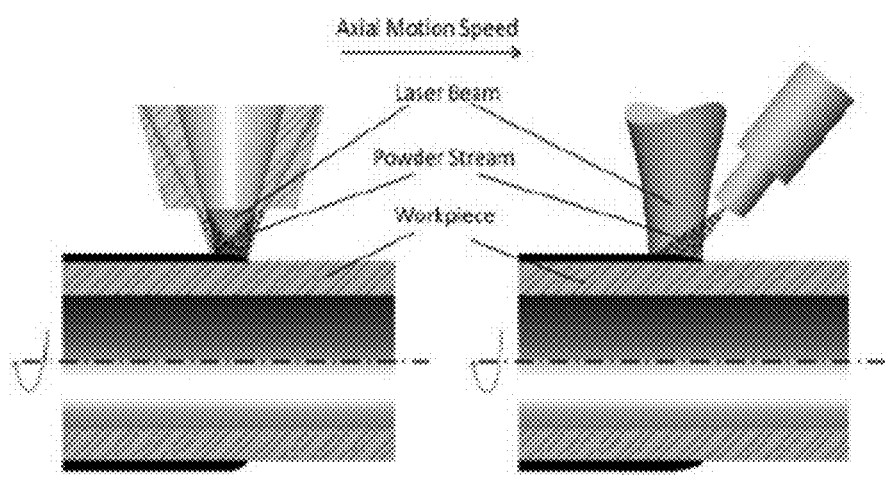
FIG. 1 depicts an exemplary process by which powder is applied to a substrate and simultaneously cured by a laser.

The present invention may be understood more readily by reference to the following detailed description taken in connection with the accompanying figures and examples, which form a part of this disclosure. It is to be understood that this invention is not limited to the specific devices, methods, applications, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. Any documents mentioned herein are incorporated herein in their entireties for any and all purposes.

The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

The disclosed techniques may be used in a variety of applications. As one example, metallic brazing materials (e.g., in particulate form) are mixed with polymer binder materials (e.g., in particulate form). The mixture is applied via LDT, spraying, or other techniques known to those of skill in the art to substrates—e.g., tubes and other shapes to be brazed together—in a controlled manner so as to allow a user to modulate the quantity of material deposited, the shape of the material deposit, or both. One may apply a mixture of carbon aerogel powder and a polymer powder to particular substrate regions in a controlled band or other shape so as to form a bearing material between two tubes (or other substrates) in order to bend the tubes, followed by brazing the tubes together.

An aerogel is suitably a porous, lightweight material. In some embodiments, an aerogel is a porous ultralight material derived from a gel in which the liquid component of the gel has been replaced with a gas, e.g., via supercritical drying processes. Aerogels suitably have extremely low weight per volume. An aerogel may be, for example, a carbon aerogel, such as that from Ocellus, Inc.; other aerogels (e.g., silica, metal oxide, resorcinol-formaldehyde, chalcogenide, aerographite and graphene) are also considered suitable, and aerogels are known to those of ordinary skill in the art.

As one example, carbon aerogels comprise particles with sizes in the nanometer range, covalently bonded together. An aerogels may have a comparatively high porosity (e.g., over 25%, over 30%, over 50%, with a pore diameter under about 150 or about 100 nm) and a surface area ranging between about 300-1,200 $m^2/g$. Such materials may be manufactured as composite paper, e.g., non-woven paper made of carbon fibers, impregnated with resorcinol-formaldehyde aerogel, and pyrolyzed.

Aerogels may be electrically conductive. As one example, carbon aerogels are be electrically conductive, with values ranging up to thousands of farads based on a capacitance density of about 104 F/g and about 77 $F/cm^3$.

An aerogel may have a comparatively low density (e.g., less than about 0.8 or 0.5 $g/cm^3$, e.g., 0.003-0.35 $g/cm^3$), comparatively high electrical conductivity, and also extremely low thermal conductivity. In some embodiments, carbon aerogels are composed of particles with sizes in the nanometer range that are bonded together. Such materials may have a high porosity (e.g., greater than 20%, 30%, 40%, 50%, 60%, or even greater). The materials may have a pore diameter of less than about 100 nm, in some embodiments. The aerogel may be present in solid form or even in particulate form. An aerogel may be formed in situ at the desired location, should that suit the user's needs. It should also be understood that the disclosed technology may employ a single aerogel, or two or more aerogels.

As explained above, aerogels may have low thermal conductivities. As an example, silica aerogel has an extremely low thermal conductivity: from 0.03 W/m·K in atmospheric pressure down to 0.004 W/m·K in modest vacuum, which correspond to R-values of 14 to 105 (United States customary) or 3.0 to 22.2 (metric) for 3.5 in (89 mm) thickness. Aerogels may also have conductivities in the range of from about 3 mW/m*K to about 20 mW/m*K. Again without being bound to any particular theory, the presence of the aerogel allows for brazing or other processing while also thermally insulating the surfaces from one another.

Exemplary metallic material (e.g., brazing material) suitable for the disclosed technology include gold, nickel, alloys thereof, and the like. The metallic material may be in particulate form, and may include particles that have a cross-sectional dimension of less than about 100 or even about 50 microns. The metallic material may include particles that differ from one another in terms of size, composition, or both. As one non-limiting example, the metallic material may include a bimodal distribution of metal particles.

Similarly, binder (e.g., polymers used as binders) and aerogel material may suitably have a cross-sectional dimension of less than about 100 microns or even less than 50 microns. Binder and aerogel (and metallic material) may be present in mono- or polydisperse form.

A structure produced by the disclosed techniques may define a cross-sectional dimension in the range of from about 0.001 microns to about 50 microns, to about 100 microns, to about 500 microns, or even to about 1,000 or 10,000 microns. A structure may, alternatively, have a cross-sectional dimension in the range of from about 0.001 inches to about 0.1 inches. Structures having even larger cross-sectional dimensions may also be fabricated according to the disclosed techniques. It should be understood that the disclosed techniques may be applied to form a coating, a band, a ring, a cone, a pyramid, a cube, or a material deposit of essentially any shape.

As one non-limiting example, LDT may be used in conjunction with a polymer-metal mixture to give rise to a coating on a substrate, a pyramid that extends from a substrate, or other structures. It should be understood that the disclosed process is not limited to disposing material atop a flat substrate; material may be disposed on a non-flat substrate (e.g., a curved substrate) or even at a substrate feature, such as a pit, slot, or other depression or protrusion. The present disclosure thus also provides articles having such a structure deposited thereon.

In some embodiments, the laser used to perform the methods is modulated so as to only sinter the polymer present in the deposited materials but not sinter metal powder present in the deposited material.

Brazing—i.e., the joining of metallic substrate materials—may be performed by the laser or other energy source set to a higher power or by other techniques known to those of ordinary skill in the art. As described elsewhere herein, a polymer-metal mixture may be cured by a radiation source (laser, oven, electron beam, electric resistance, IR source, and the like) such that the polymer is cured but the metal particles are not also sintered together in the same step. Suitable polymers may sinter in the range of from about 300 degrees to about 500 degrees.

A user may select a polymer that sinters at a temperature below the melting temperature of the metallic material. In this way, a user may cure the polymer but sinter the metal particles together at a later time.

The deposited materials may be sprayed onto the substrate, although other deposition techniques (e.g., ink-jet style printing, dipping, brushing, vapor deposition, dripping, coating, electrostatic deposition, and the like) are all considered suitable. As one example, the material being deposited is fed onto the substrate surface by way of a powder feeder; the material is suitably sintered onto the substrate at the point of material-substrate contact by a laser as shown in illustrative FIG. 1. Energy may be applied concurrent with powder deposition; in this way, a user may construct a structure in a continuous process. Curing may also be performed after powder deposition.

A variety of materials may be used as substrates. Metals are particularly suitable substrates; stainless steel and titanium are exemplary, suitable substrates. Glass and polymeric substrates may also be used.

A variety of materials may be used as binders; polymers (such as polyethylene, polypropylene, PEEK, polyamide, and other polymers) will be known to those of ordinary skill in the art. Exemplary polymer suppliers include Arkema, Eos, and others. A polymer particle may be the powder form of a polymer listed herein. An exemplary deposition composition may include, e.g., a binder and aerogel; a binder and brazing material (e.g., metallic particles), or even binder, aerogel, and brazing material. Composition materials may be mixed together before deposition onto the substrate, but may also be applied separately to the substrate, depending on the user's needs. Additional description of deposition compositions is provided elsewhere herein.

As explained elsewhere herein, any component or components of a deposition composition may be present as a polydisperse population. As one example, the deposition composition may include polymer particles of differing sizes, compositions, or both. The composition may likewise include brazing material particles of different sizes, compositions, or both. Similarly, an aerogel may also be present in the form of particles of different sizes, compositions, or both.

In one embodiment, the deposition compositions include a binder and a brazing material. A binder may be a polymer, as described elsewhere herein. Suitable brazing materials include metals, alloys, and the like. The user may adjust the relative proportions of the binder and brazing materials; the weight ratio of binder to brazing material may be in the range of from 1:1,000,000 to 1,000,000:1 and all intermediate ranges. Likewise, the weight ratio of binder to brazing material or to aerogel may be in the range of from 1:1,000,000 to 1,000,000:1 and all intermediate ranges.

Suitable binder materials include—without limitation—polyester, polyurethane, polyester, epoxy, acrylic, and combinations thereof. Thermoplastics are considered suitable binder materials, although thermosets are also suitable. Suitable brazing materials include aluminum, silicon, copper, silver, zinc, gold, nickel, and combinations thereof. Virtually any brazing material known in the art is suitable; exemplary suppliers of such materials include Colmonoy and Lucas Milhaupt, among others.

As described elsewhere herein, at least one of the binder and brazing material may be present as a population of particulates; embodiments wherein at least one of the foregoing components is present as a fluid (e.g., liquid, gas, slurry, gel) are also considered suitable. A population of particulates may comprise one or more particles having a cross-sectional dimension of less than about 50 microns, less than about 30 microns, less than about 10 microns, or even less than about 5 microns.

In another embodiment, deposition compositions include a binder and an aerogel. A binder may be a polymer, as described elsewhere herein; suitable aerogels are also described elsewhere herein. The user may adjust the relative proportions of the binder and aerogel materials; the weight ratio of binder to aerogel material may be in the range of from 1:1,000,000 to 1,000,000:1 and all intermediate ranges, as described elsewhere herein.

The present disclosure also provides methods. These methods suitably include applying a composition as disclosed elsewhere herein (e.g., a composition comprising at least two of a binder, a brazing material, and an aerogel) to a substrate; and solidifying at least a portion of the composition so as to form a structure. The structure may be disposed so as to contact first and second substrates, although the structure may also be disposed so as to contact only a first substrate. Exemplary substrates include tubes, plates, arcs, cylinders, and the like. Substrates may be tubes arranged in a concentric manner; substrates may also be oriented such that first and second substrates are essentially parallel to one another.

Substrates may be separated by a varying distance, but may also be separated by a constant distance. The structure may be disposed—as described elsewhere herein—so as to span a distance between two substrates, e.g., so as to span a gap between two concentric (or even non-concentric) tubes. Brazing steps may be performed—as described elsewhere herein—to join or seal substrate surfaces together. The structure may be disposed so as to maintain a spacing between substrates other than concentric tubes.

Solidification of the structure may be effected by energy application. Microwave, laser, thermal, and ultrasonic energy are all suitable for solidifying the structure. Laser energy is considered especially suitable. In one exemplary embodiment, a user may solidify the binder of the structure material without also solidifying the brazing material of that structure; the brazing material may be solidified in a later step. In some embodiments, solidifying is effected contemporaneously with the applying. In another embodiment, the user may apply a composition comprising binder and aerogel so as to maintain a spacing between two surfaces following by a processing step (e.g., application of heat) that eliminates the composition, as shown in FIG. 2.

As described elsewhere herein, the disclosed structures may be of virtually any shape and/or dimension. Ring-shaped, cube-shaped, cylinder-shaped, square-shaped, and disc-shaped structures are all considered suitable. A structure may define a cross-sectional dimension in the range of from about of between about 0.01 microns and about 100,000 microns, or from about 1 micron to about 1000 microns, or from about 5 microns to about 500 microns, or even from about 10 microns to about 100 microns.

As described elsewhere herein, a variety of aerogel materials are suitable for use in the disclosed compositions. Exemplary aerogels include a carbon aerogel, a silica aerogel, an alumina aerogel, SEAgel (Safe Amulsion Agar gel), chalcogel (also known as a metal chalcogenide aerogel), or any combination thereof; other suitable aerogels are described elsewhere herein. It should be understood that the preceding aerogels are not limiting.

Figure 2:
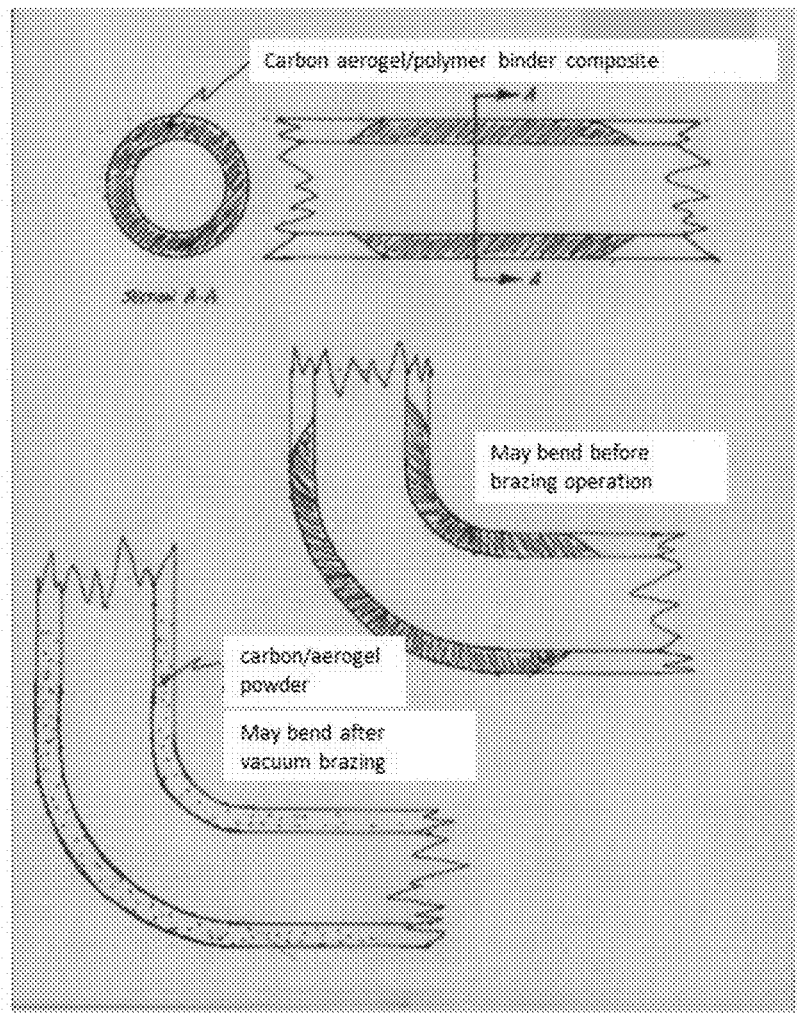
FIG. 2 depicts an exemplary aerogel-polymer composition applied so as to fill a space between inner and out tubes (upper panel), the aerogel-polymer composition between the aforementioned space after the tubes have been bent (middle panel), and (lower panel) the tubes with a space between them that was formerly occupied by the polymer-aerogel composition after a brazing step has eliminated the polymer-aerogel composition.

An illustrative embodiment is shown in FIG. 2. The top panel of that figure shows an aerogel-binder composition (shown with darkened shading) present between two concentric tubes. A user may apply the aerogel-binder composition to the outside of the inner tube. The composition may be cured, and the outer tube may be positioned so that the composition-coated inner tube is disposed within the outer tube. It should be understood that the composition may also be cured after the tubes are positioned relative to one another. Without being bound to any particular theory, the composition may be characterized as a bearing between the tubes that acts to maintain spacing between the inner and outer tubes. The tubes may be left in a straight configuration, but bent tubes may also be used.

It should be understood that the present disclosure is not limiting to aerogel-containing compositions that are disposed between tubes; the compositions may also be used to maintain spacing between substrates other than tubes. As one example, a composition according to the present disclosure may be used to maintain spacing between two planar surfaces or even two surfaces of a C-shaped substrate.

A surface or substrate may be bent as shown in the middle panel of FIG. 2. The bending may be performed before or after the aerogel-binder composition is cured. A further brazing operation may be performed (not shown); the brazing results in the elimination of the binder and aerogel, as shown in the bottom panel of FIG. 2. The brazing may be performed such that there is sufficient present to eliminate (e.g., via thermal decomposition) the binder and aerogel. In some embodiments, the aerogel and/or polymer decompose into a powder or dust that does not form a "thermal short" or other pathway between the inner and outer tubes.

It should again be understood that FIG. 2 is illustrative only, as the disclosed technology is not limited to tubes or even concentric tubes. The disclosed technology may be applied to substrates of any shape or configuration. As will be appreciated the ability of the disclosed technology allows a user to maintain a space between two substrates or even between two regions of a single substrate (e.g., a substrate curved into a C- or S-shape).

It should also be understood that the aerogel-polymer composition may be used to define a constant space between two surfaces, e.g., two flat surfaces. Alternatively, the disclosed technology may be used to maintain space between surfaces having a varying separation, e.g., flat surfaces that slope away from one another. The present disclosure thus also provides articles having surfaces that are spaced apart, the spacing between surfaces being maintained by the disclosed composition in cured or uncured form.

A user may effect formation of reduced pressure (e.g., a vacuum) in a sealed space between two surfaces. Exemplary such methods and reduced pressures are set forth in U.S. Pat. No. 7,374,063 and U.S. Pat. No. 7,681,299, both of which are incorporated herein by reference in their entireties for any and all purposes. The reduced pressure may be effected by mechanical means or by other techniques known to those of ordinary skill in the art.

The present disclosure also provides workpieces. The workpieces suitably include a first structure and a second structure separated by a distance, the distance being at least partially occupied by a composition comprising a binder, a brazing material, and an aerogel.

Suitable binders, brazing materials, and aerogels are all described elsewhere herein. The distance may be characterized as a gap or other space between the two structures; in one embodiment, the structures are concentric tubes. The structures may be straight or planar, but may also be curved, C-shaped, tubular, or of other configuration.

As described elsewhere herein, the composition may be present so as to maintain the distance between the first and second structures. Exemplary methods of depositing the composition (spraying, vapor deposition, and the like) are described elsewhere herein and are known to those of ordinary skill in the art. As one example, the composition may be applied so as to maintain a spacing between the first and second structures. In one embodiment, a user may use an aerogel (which may optionally also include a binder material) to maintain a spacing between two concentric tubes and then braze the ends of the tubes together (at the ends of the tubes) so as to create a tubular insulated, sealed space between the two concentric tubes, where the tubular space was maintained by the presence of the aerogel.

What is claimed:

1. A method, comprising:
   dispensing, at a location on a first substrate, a particulate composition comprising an aerogel and a binder material;
   solidifying at least a portion of the dispensed particulate composition so as to form a structure;
   positioning a second substrate such that the structure maintains a spacing between the first and second substrates;
   bending the first and second substrates such that the structure maintains the spacing between the bent first and second substrates; and
   at least partially eliminating the structure.

2. The method of claim 1, wherein the first and second substrates are tubes arranged in a concentric manner.

3. The method of claim 1, wherein the first and second substrates are essentially parallel to one another.

4. The method of claim 1, wherein the first and second substrates are separated by a varying distance.

5. The method of claim 1, wherein the structure is disposed so as to seal a gap between the first and second substrates.

6. The method of claim 1, wherein the solidifying is effected by laser energy.

7. The method of claim 1, further comprising effecting a reduced pressure in a region between the first and second substrates that comprises the spacing.

8. The method of claim 1, wherein the particulate composition further comprises a brazing material.

9. The method of claim 1, wherein the solidifying is effected contemporaneously with the dispensing.

10. A method, comprising:
    dispensing, at a location on a first substrate, a particulate composition comprising at least a binder and a brazing material;
    solidifying at least a portion of the binder so as to form a structure;
    positioning a second substrate relative to the first substrate such that the structure maintains a spacing between the first and second substrates;
    bending the first and second substrates such that the structure maintains the spacing between the bent first and second substrates; and solidifying the brazing material in a second solidifying step.

11. The method of claim 10, wherein the first substrate is a first tube.

12. The method of claim 11, wherein the second substrate is a second tube arranged concentrically with the first tube.

13. The method of claim 10, wherein the particulate composition comprises an aerogel.

14. The method of claim 10, wherein the solidifying is effected by laser energy.

15. The method of claim 10, wherein the structure defines a cross-sectional dimension of between about 0.01 microns and about 100,000 microns.

16. The method of claim 10, wherein the solidifying is effected contemporaneously with the dispensing.

* * * * *